(12) United States Patent
Itou et al.

(10) Patent No.: US 11,213,060 B2
(45) Date of Patent: Jan. 4, 2022

(54) ROLLED FOOD PRODUCT MANUFACTURING APPARATUS AND MANUFACTURING METHOD

(71) Applicant: NICHIREI FOODS INC., Tokyo (JP)

(72) Inventors: Ryuichi Itou, Chiba (JP); Suguru Hirayama, Chiba (JP); Masahiko Honda, Chiba (JP)

(73) Assignee: NICHIREI FOODS INC., Tokyo (JP)

( * ) Notice: Subject to any disclaimer, the term of this patent is extended or adjusted under 35 U.S.C. 154(b) by 0 days.

(21) Appl. No.: 16/652,338

(22) PCT Filed: Oct. 18, 2018

(86) PCT No.: PCT/JP2018/038854
§ 371 (c)(1),
(2) Date: Mar. 30, 2020

(87) PCT Pub. No.: WO2019/078301
PCT Pub. Date: Apr. 25, 2019

(65) Prior Publication Data
US 2020/0236985 A1 Jul. 30, 2020

(30) Foreign Application Priority Data
Oct. 20, 2017 (JP) .............................. JP2017-204063

(51) Int. Cl.
*A23P 20/20* (2016.01)
*A21C 9/06* (2006.01)
*A23P 20/25* (2016.01)

(52) U.S. Cl.
CPC .............. *A23P 20/20* (2016.08); *A21C 9/063* (2013.01); *A23P 20/25* (2016.08)

(58) Field of Classification Search
CPC .................................. A23P 20/25; A23P 20/20
(Continued)

(56) References Cited

U.S. PATENT DOCUMENTS

| | | |
|---|---|---|
| 4,047,478 A | 9/1977 | Trostmann et al. |
| 4,608,919 A | 9/1986 | Prows et al. |

(Continued)

FOREIGN PATENT DOCUMENTS

| | | |
|---|---|---|
| JP | 51-29242 A | 3/1976 |
| JP | 63-30642 Y2 | 8/1988 |

(Continued)

OTHER PUBLICATIONS

International Search Report for PCT/JP2018/038854 (PCT/ISA/210) dated Dec. 18, 2018.
(Continued)

*Primary Examiner* — Reginald Alexander
(74) *Attorney, Agent, or Firm* — Birch, Stewart, Kolasch & Birch, LLP (57) ABSTRACT

To provide a rolled food product manufacturing apparatus and manufacturing method capable of improving productivity. A rolled food product manufacturing apparatus includes an outlet from which an air stream flows, a conveyor section having a loading member provided with openings through which the air stream flowing from the outlet toward a loading surface passes and conveying a sheet-like base material put on the loading surface in one direction, and a holding part holding one part of the base material floated from the loading surface by the air stream in a floated state.

9 Claims, 8 Drawing Sheets

(58) Field of Classification Search
USPC .......... 99/450.1, 450.2, 450.3, 450.4, 450.5, 99/450.6, 450.7
See application file for complete search history.

(56) References Cited

U.S. PATENT DOCUMENTS

| | | | | |
|---|---|---|---|---|
| 5,161,458 | A * | 11/1992 | Cheung | A21C 9/063 99/450.1 |
| 6,892,514 | B2 * | 5/2005 | Kragh | B65B 11/10 53/209 |
| 2004/0045449 | A1 * | 3/2004 | Groff | A21C 15/02 99/450.1 |
| 2008/0135458 | A1 | 6/2008 | Ou-Young | |

FOREIGN PATENT DOCUMENTS

| | | |
|---|---|---|
| JP | 2003-63502 A | 3/2003 |
| JP | 2015-29505 A | 2/2015 |

OTHER PUBLICATIONS

Written Opinion of the International Searching Authority for PCT/JP2018/038854 (PCT/ISA/237) dated Dec. 18, 2018.

* cited by examiner

ROLLED FOOD PRODUCT MANUFACTURING APPARATUS AND MANUFACTURING METHOD

TECHNICAL FIELD

The present invention relates to a rolled food product manufacturing apparatus and manufacturing method.

BACKGROUND ART

Figure 14A:
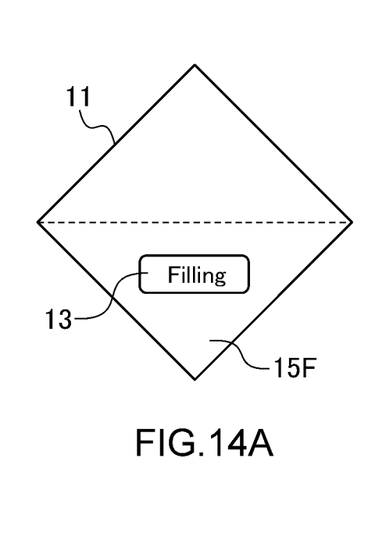
Figure 14B:
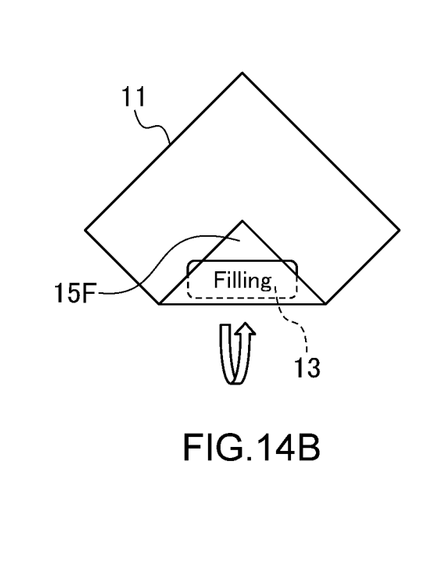
Figure 14C:
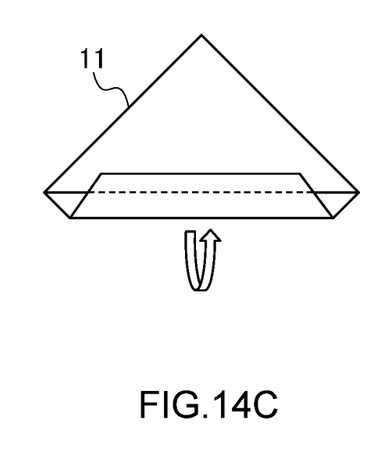
Figure 14D:
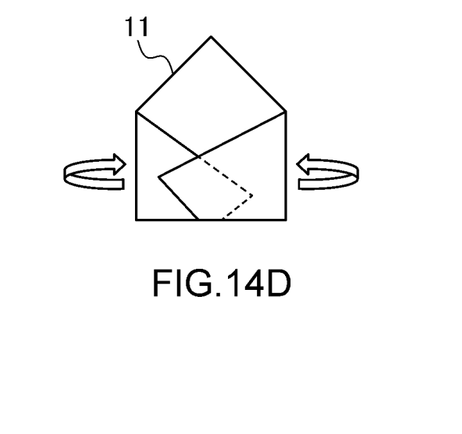
Figure 14E:
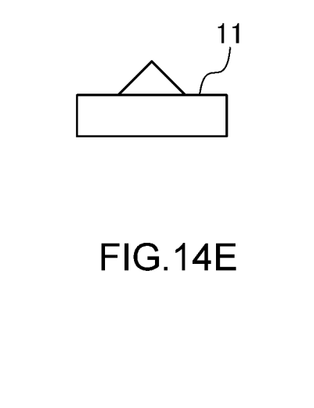
Figure 14F:
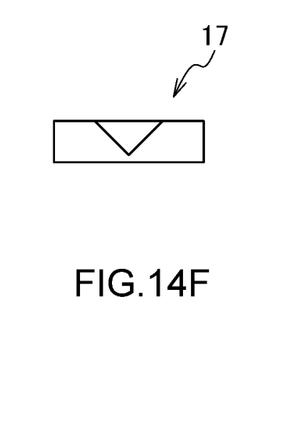

As rolled food products, food products in which a filling is rolled up in a sheet-like base material such as an spring roll, a burrito, a taco and a crepe, and food products in which only the base material is rolled without using the filling such as a rolled omelet can be cited. A way of rolling the base material differs according to the rolled food products. For example, an example of a common way of rolling the base material in the spring roll will be explained with reference to FIGS. 14A to 14F. A filling 13 is put on a place closer to one corner part 15F from the center of a square-shaped base material 11 (FIG. 14A). Next, the one corner part 15F is folded so as to wrap up the filling 13 (FIG. 14B). Hereinafter, a stage shown in FIG. 14B in which the one corner part 15F is folded toward opposite another corner part is called a first folding. Subsequently, the filling 13 is wrapped so as to be rolled toward another corner part opposite to the one corner part 15F (FIG. 14C, a second folding). Next, left and right corner parts are folded toward the center of the base material 11 (FIG. 14D, third and fourth foldings). Subsequently, the base material is folded twice so as to be rolled toward another corner part (FIG. 14E, a fifth folding). Lastly, another corner part as a roll end is pasted with a paste formed by dissolving flour with water (FIG. 14F).

Various apparatuses for manufacturing rolled food products including the process of performing the first folding have been disclosed (for example, PTLs 1 and 2). In PTL 1, an apparatus in which one corner of a base material put on a conveyor belt is blown up by an air stream to perform the first folding is disclosed. In PTL 2, there is disclosed an apparatus in which a first conveyor is stopped when one corner of a base material reaches a stopper and the first conveyor is moved to rotate downward to thereby fold the base material so that the one corner stands, and the first conveyor is activated again and the base material is delivered to a second conveyor to thereby perform the first folding.

CITATION LIST

Patent Literature

PTL 1: JP-A-51-29242
PTL 2: JP-A-2015-29505

SUMMARY OF INVENTION

Technical Problem

As the base material is merely blown up by the air stream in the case of PTL 1, a position where the one corner of the base material is folded toward another corner is unstable; therefore, a shape of the first folding is not stable, which leads to a problem that defective products are increased. In the case of PTL 2, a manufacturing apparatus becomes complicated as the first conveyor and the second conveyor are necessary, which leads to a problem that manufacturing speed is suppressed and productivity is reduced.

An object of the present invention is to provide a manufacturing apparatus and a manufacturing method for rolled food products capable of improving productivity.

Solution to Problem

A rolled food product manufacturing apparatus according to the present invention includes an outlet from which an air stream flows, a conveyor section having a loading member provided with openings through which the air stream flowing from the outlet toward a loading surface passes and conveying a sheet-like base material put on the loading surface in one direction, and a holding part holding one part of the base material floated from the loading surface by the air stream in a floated state.

A rolled food product manufacturing method according to the present invention includes conveying a sheet-like base material in one direction, floating one part of the base material by an air stream, holding the one part of the base material floated by the air stream in a floated state, and folding the one part of the base material held in the floated state to a direction of the other part opposite to the one part.

Advantageous Effects of Invention

According to the present invention, one part of the base material is held in the state of being floated from the loading surface to thereby form the first folding stably; therefore, a defective rate can be reduced and productivity can be improved.

BRIEF DESCRIPTION OF DRAWINGS

Each of FIGS. 14A, 14B, 14C, 14D, 14E and 14F is a view for explaining way of rolling an spring roll, in which FIG. 14A shows a state where a filling is put on a base material, FIG. 14B shows a first folding, FIG. 14C shows a second folding, FIG. 14D shows third and fourth foldings, FIG. 14E shows a fifth folding, and FIG. 14F shows pasting.

DESCRIPTION OF EMBODIMENTS

A rolled food product manufacturing apparatus according to the present invention includes an outlet from which an air stream flows, a conveyor section having a loading member provided with openings through which the air stream flowing from the outlet toward a loading surface passes and conveying a sheet-like base material put on the loading surface in one direction, and a holding part holding one part of the base material floated from the loading surface by the air stream in a floated state. The rolled food product manufacturing apparatus holds one part of the base material conveyed in one direction in the state of being floated from the loading surface to thereby stably form a first folding while conveying the base material; therefore, a defective rate can be reduced and productivity can be improved.

It is sufficient that the air stream flowing from the outlet can float one part of the base material from the loading surface. The air stream may be a compressed gas supplied from a compressor connected through a pipe or an air supplied from a blower.

The conveyor section conveys the base material put on the loading surface of the loading member in one direction. There are a case where the loading surface is in an approximately horizontal state and a case where the loading surface is inclined upward or downward from an upstream side to a downstream side. The approximately horizontal state includes a horizontal state and a state where the surface is slightly inclined from the horizontal state. When the loading surface is inclined, an angle thereof may be selected within a range in which the base material put on the loading surface does not slip down. The conveyor section may convey the base material while changing speed or intermittently, not limited to the case where the base material is conveyed at a fixed speed. The openings provided on the loading member pierce the loading member in a direction perpendicular to the loading surface. Holes or gaps formed in the loading member can be adopted as the openings.

The base material is not particularly limited, and skin materials made from flour or corn flour, cake dough and so on can be applied according to menus of rolled food products. One part of the base material is preferably an outer peripheral edge portion of the base material. More specifically, one part of the base material corresponds to an outer peripheral edge portion of the base material conveyed in one direction by the conveyor section which has passed on an opening where the air stream flows.

The holding part holds one part of the base material floated from the loading surface in the floated state. It is sufficient that the holding part holds one part of the base material floated from the loading surface in the floated state, and it does not matter whether the holding part touches one part of the base material or not. The holding part is not limited to a structure including a holding member and an attracting mechanism, and the holding part may hold one part of the base material at a predetermined position by means such as suction and a mechanical contact without using the holding member. The holding part may hold the base material with a force enough to release the holding of the floated one part of the base material by a force of pulling the base material in a conveying direction by the conveyor section. The holding part may include a function of releasing the holding of the floated one part of the base material.

The holding part may hold one part of the base material floated from the loading surface by using the air stream from an air stream generator. The air stream generator is not limited to a compressor, and a suction device (vacuum pump) may be adopted. In the case where the air stream generator is the compressor, a compressed gas is jetted from a nozzle to generate the air stream. In the case where the air stream generator is the suction device, ambient gas is sucked from suction ports to generate the air stream. It is sufficient that the air stream touches the floated one part of the base material, and the direction of the air stream can be suitably selected in a range from a parallel direction to an upward perpendicular direction with respect to the loading surface. The air stream is not limited to an air stream flowing toward one part of the base material but includes an air stream in a direction touching one part of the base material. The air stream is suitably directed upward with respect to the loading surface. The upward air stream may be upward with respect to the loading surface, which is not limited to a case where the air stream is directed to the direction perpendicular to the loading surface.

The holding member performs positioning of one part of the base material floated from the loading surface at a predetermined position in a height direction or in the conveying direction. The holding member is arranged along the surface of the floated one part of the base material on the loading surface's side. The attracting mechanism attracts the floated one part of the base material to the holding member by using the air stream from the air stream generator, a mechanical force, a suction force by static electricity and so on. The air stream of the attracting mechanism may use an upward air stream with respect to the loading surface and an air stream approximately parallel to the loading surface.

Hereinafter, embodiments of the present invention will be explained in detail with reference to the drawings.

1. First Embodiment (Entire Structure)

A rolled food product manufacturing apparatus (hereinafter referred to as a "manufacturing apparatus") 10A shown in FIG. 1 and FIG. 2 includes a belt conveyor 12 as a conveyor section, an outlet 16 and a holding part 18A. In the drawings, an X-direction corresponds to a conveying direction, and a work W is conveyed from left to right. An upper side in a Z-direction is defined as "upper" and a lower side is defined as "lower" in the drawing. In the drawing, the work W includes a sheet-like base material 11 and a filling 13 put on the base material 11. The filling 13 is not particularly limited, and can be suitably selected according to menus of rolled food products such as an spring roll, a burrito and a roll cake.

The belt conveyor 12 includes a drive pulley, a driven pulley (not shown) and an endless belt 14 as a loading member stretched over the drive pulley and the driven pulley. In the case of the embodiment, the endless belt 14 includes a plurality of round belts 17 having a circular cross section as shown in FIG. 2. A surface 14S of the endless belt 14 on which the base material 11 is put is referred to as a loading surface. Openings are gaps 19 between respective round belts 17.

An air stream for floating one part of the base material 11 from the loading surface 14S flows from the outlet 16. In the case of the embodiment, one part of the base material 11 is a tip end 15F arranged on a downstream side of the belt conveyor 12. The base material 11 has a square shape and arranged in a state of a rhombus shape toward the conveying direction; therefore, the tip end 15F is a corner part including one angle of the square.

The outlet 16 is arranged on a lower side of the loading surface 14S of the endless belt 14. The outlet 16 has a linear shape in which a longitudinal direction thereof is a width direction (a Y-direction in the drawing) of the belt conveyor 12, which faces upward. Compressed gas supplied from a compressor (not shown) connected through a pipe 21 is jetted from the outlet 16 as the air stream. The compressed gas jetted from the outlet 16 passes through the gaps 19 between the round belts 17 as the openings and flows upward toward the loading surface 14S of the endless belt 14. The tip end 15F of the base material 11 is floated from the loading surface 14S by the compressed gas passing through the gaps 19.

The holding part 18A includes a holding member 20 and an attracting mechanism for attracting the tip end 15F of the base material 11 to the holding member 20. The holding member 20 is provided on the downstream side in the conveying direction with respect to the outlet 16. The holding member 20 according to the embodiment is a plate-like member and arranged at a predetermined position above the belt conveyor 12 so that a holding surface 23 as one-side surface faces to an upstream side. A predetermined clearance through which at least the work W can pass is provided between a lower end of the holding member 20 and the loading surface 14S.

In the case of the embodiment, the holding part 18A holds the tip end 15F by using Coanda effect by the air stream from a later-described nozzle 22A. The attracting mechanism has the nozzle 22A from which compressed gas is jetted along the holding surface 23. The nozzle 22A is formed by a member with an L-shaped cross section provided on a lower side of the holding member 20. The nozzle 22A has a linear shape having the same length as a length of the lower side of the holding member 20 in the width direction, which is directed upward. A compressor (not shown) as an air stream generator is connected to the nozzle 22A through a pipe 27 connected to a supply hole 25 piercing the holding member 20 in a thickness direction. Here, the thickness direction of the holding member 20 is a direction perpendicular to the holding surface 23 of the holding member 20. The compressed gas supplied from the compressor flows into the nozzle 22A from the supply hole 25 and jetted from the lower side of the holding surface 23 through the nozzle 22A to be an upward air stream flowing along the holding surface 23.

It is preferable that the manufacturing apparatus 10A includes a partition plate 24 on the upstream side of the outlet 16. The partition plate 24 improves straightness of the compressed gas jetted from the outlet 16 by partitioning the belt conveyor 12 into the upstream side and the downstream side. The partition plate 24 is a plate-like member similar to the holding member 20, which is arranged in parallel to the holding member 20. That is, the partition plate 24 is arranged so that a partition surface 29 as a one-side surface is in parallel to the width direction of the endless belt 14. The partition plate 24 is arranged at an upper predetermined position. A predetermined clearance through which at least the work W can pass is provided between a lower end of the partition plate 24 and the loading surface 14S.

It is preferable that the manufacturing apparatus 10A includes presser parts 26 respectively on both sides in the width direction of the endless belt 14. The presser parts 26 prevent positional displacement of the base material 11 due to the compressed gas jetted from the outlet 16. The presser parts 26 hold both side portions 15R, 15L of the base material 11 in the thickness direction. The thickness direction of the base material 11 is a direction perpendicular to the loading surface 14S. The presser part 26 shown in the drawing includes a second drive pulley 28, a second driven pulley 33 and an endless presser belt 30 stretched over the second drive pulley 28 and the second driven pulley 33. The second drive pulley 28 and the second driven pulley 33 are arranged so that a running direction of the presser belt 30 is parallel to the conveying direction. The both side portions 15R, 15L of the base material 11 are sandwiched between the presser belts 30 and the loading surface 14S of the endless belt 14 on a surface on which the presser belts 30 run in a forward direction with respect to the conveying direction. The second drive pulleys 28 allow the pressure belts 30 to run at the same speed as a conveying speed of the endless belt 14.

It is preferable that a sensor 35 detecting that the base material 11 reaches the downstream side of the holding part 18A is provided on the downstream side of the holding part 18A in the conveying direction. The sensor 35 is not particularly limited, and for example, a photoelectric sensor or an electrostatic capacitance type proximity sensor can be used. In the case of the drawing, the sensor 35 is provided on the surface of the holding member 20 on the downstream side and in the center of the endless belt 14 in the width direction. The sensor 35 may further detect that the base material 11 passes the holding part 18A completely.

(Operation and Effect)

The operation and effect of the manufacturing apparatus will be explained. First, the base material 11 is put on the endless belt 14 so that the tip end 15F is positioned on the downstream side, a rear end 15B opposite to the tip end 15F is positioned on the upstream side, and so that the tip end 15F and the rear end 15B are parallel to the conveying direction. In the case of the drawing, the filling 13 is put on a place close to the tip end 15F in the base material 11.

The endless belt 14 is activated and the base material 11 on which the filling 13 is put is conveyed to the downstream side. The both side portions 15R, 15L of the base material 11 are held in the thickness direction by the presser parts 26. When the base material 11 is further conveyed to the downstream side, the tip end 15F of the base material 11 reaches the partition plate 24.

Figure 3:
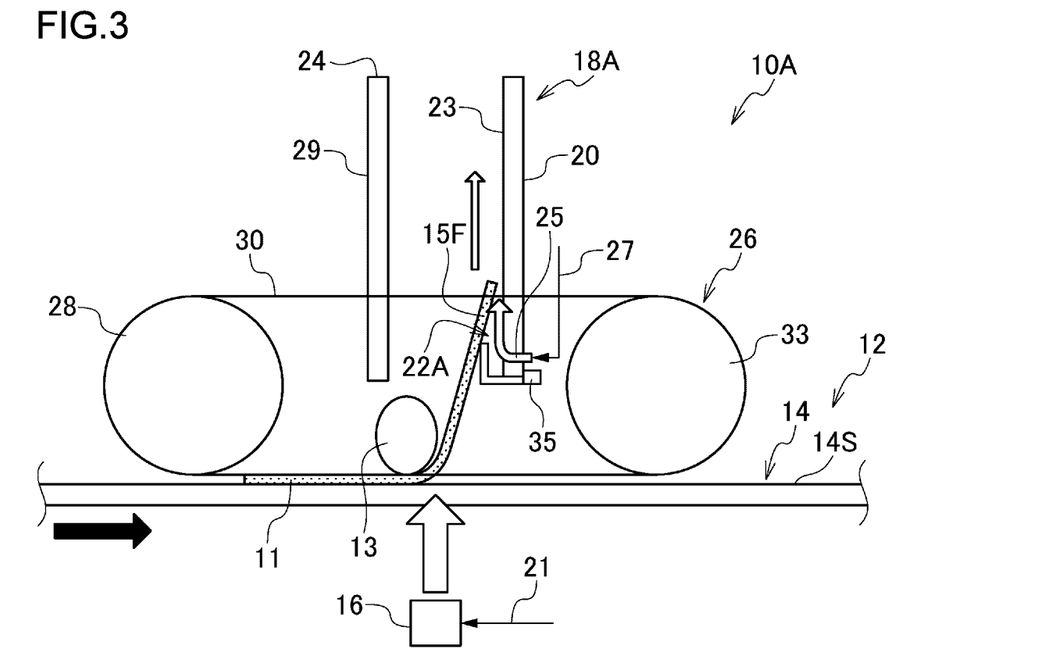
FIG. 3 is a front view schematically showing a use state (1) of the rolled food product manufacturing apparatus according to the first embodiment.

The compressed gas is jetted upward from the outlet 16 toward the endless belt 14 on the downstream side of the partition plate 24. The tip end 15F of the base material 11 reaching at the downstream side of the partition plate 24 is conveyed to the downstream direction in a state of being separated from the loading surface 14S and floated from the loading surface 14S by the compressed gas jetted from the outlet 16. Next, the floated tip end 15F is conveyed to the downstream direction and an area receiving the compressed gas is increased; therefore, the tip end 15F becomes in a standing state and reaches the vicinity of the holding surface 23. The upward air stream is formed by the compressed gas jetted from the nozzle 22A along the surface of the holding surface 23. The tip end 15F is attracted to the holding surface 23 and held in the floated state by Coanda effect generated by the upward air stream formed along the holding surface 23 (FIG. 3).

Figure 4:
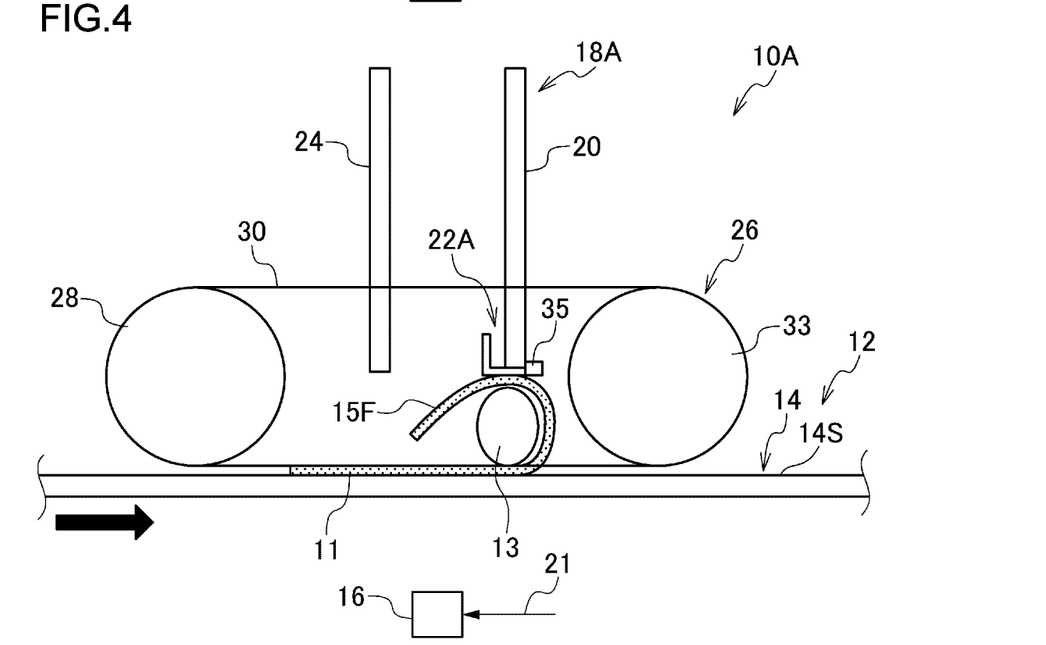
FIG. 4 is a front view schematically showing a use state (2) of the rolled food product manufacturing apparatus according to the first embodiment.

The base material 11 is further conveyed to the downstream side and reaches the downstream side of the holding member 20. When the sensor 35 detects that the base material 11 has reached the downstream side of the holding member 20, the manufacturing apparatus 10A stops the compressed gas jetted from the outlet 16 and the nozzle 22A to release the holding of the tip end 15F. Then, the tip end 15F attracted to the holding surface 23 is separated from the holding member 20 and turns downward. As the base material 11 is conveyed to the downstream direction all the time, the tip end 15F is folded in a direction of the rear end 15B opposite to the tip end 15F so as to wrap the filling 13 in the tip end 15F (FIG. 4).

When the manufacturing apparatus 10A detects that the rolled food product to which the first folding is performed has been completely conveyed to the downstream side of the holding member 20 by the sensor 35, the manufacturing apparatus 10A starts jetting of the compressed gas from the outlet 16 and the nozzle 22A again, waiting for another work W subsequently conveyed from the upstream side. As described above, the manufacturing apparatus 10A wraps the filling 13 in the base material 11 to manufacture the rolled food product to which the first folding is performed.

The manufacturing apparatus 10A can hold the tip end 15F in the state of being floated from the loading surface 14S even when the outlet 16 is blocked by the base material 11 conveyed to the downstream direction by attracting the tip end 15F to the holding surface 23 in the holding part 18A. Accordingly, the manufacturing apparatus 10A can form the first folding stably; therefore, a defective rate can be reduced and productivity can be improved.

The manufacturing apparatus 10A performs the first holding without stopping conveyance of the base material 11 on the endless belt 14, thereby increasing the number of rolled fool products which can be manufactured per a unit time.

As the tip end 15F is held by using the air stream without mechanical contact in the case of the embodiment, the tip end 15F can be held so as not to damage the base material 11. Therefore, the manufacturing apparatus 10A can further reduce the detect rate.

The straightness of the compressed gas jetted from the outlet 16 can be improved by providing the partition plate 24 on the upstream side of the outlet 16; therefore, the tip end 15F can be floated more stably.

The both side portions 15R, 15L of the conveyed base material 11 are held by the presser parts 26 in the thickness direction. Therefore, the manufacturing apparatus 10A can prevent positional displacement of the base material 11 due to the compressed gas jetted from the outlet 16 and can float the tip end 15F to a predetermined height, thereby forming the first folding more stably.

The compressed gas jetted from the outlet 16 and the nozzle 22A is stopped at the timing when the tip end 15F of the base material 11 reaches the downstream side of the holding member 20, thereby suppressing fluttering of the base material 11. As the manufacturing apparatus 10A can fold the tip end 15F at a predetermined position, the first folding can be formed more stable.

In the case of the embodiment, the case where jetting of the compressed gas is started again from the outlet 16 and the nozzle 22A when the sensor 35 detects that the rolled food product to which the first folding is performed has been completely conveyed to the downstream side of the holding member 20 has been explained; however, the present invention is not limited to the above. For example, the manufacturing apparatus 10A may include a timer (not shown) measuring a lapsed time after the base material 11 reaches the downstream side of the holding member 20, namely, after the stop of the compressed gas jetted from the outlet 16 and the nozzle 20A. The manufacturing apparatus 10A suitably selects a setting time of the timer, thereby suitably changing the timing when jetting of the compressed gas from the outlet 16 and the nozzle 22A is started again so as to correspond to intervals at which the work W is conveyed.

As the outlet 16 and the nozzle 22A have the linear shape in which the longitudinal direction thereof is the width direction of the endless belt 14, the tip end 15F can be floated more positively even when the position of the tip end 15F is displaced in the width direction of the endless belt 14; therefore, the first folding can be formed more stably.

The manufacturing apparatus 10A can adjust a size of the clearance between the tip end 15F and the filling 13 by changing the timing when the compressed gas jetted from the nozzle 20A is stopped. For example, in a case where the timing when the compressed gas jetted from the nozzle 22A is stopped is delayed, the tip end 15F covers the filling 13 in a state where the filling 13 moves to the downstream side for an amount due to the delay of the timing; therefore, the clearance between the tip end 15F and the filling 13 is reduced. Accordingly, the manufacturing apparatus 10A can manufacture the rolled food product which is rolled more tightly by delaying the timing when the compressed gas jetted from the nozzle 22A is stopped.

In a case where the timing when the compressed gas jetted from the nozzle 22A is stopped is advanced, the tip end 15F covers the filling 13 on the upstream side for an amount due to the advance of the timing, so that the clearance between the tip end 15F and the filling 13 is increased. Therefore, the manufacturing apparatus 10A can manufacture the rolled food product which is rolled more loosely by advancing the timing when the compressed gas jetted from the nozzle 22A is stopped.

Though the process of performing the first folding by the manufacturing apparatus 10A has been explained, the present invention may be applied to an apparatus further including a process of a second folding and subsequent processes. The manufactured rolled food product may be a frozen food product by further performing a freezing process. Freezing can be performed by a well-known method, and for example, preservability can be secured by performing freezing at equal to or lower than −18° C. The frozen food products can be sold in a wide area by maintaining a frozen state also during transportation. Obtained frozen food products can be defrosted and cooked, for example, by deep frying, a microwave oven, an oven, an oven toaster and so on.

In a case where the manufactured rolled food product is ready prepared food for deep-frying, the rolled food product may be a fried food product for ready prepared food by performing a process of deep frying. The deep-frying process can be performed by a well-known method, which can be conducted at, for example, approximately 150 to 200° C. according to kinds of food. The time of deep frying can be suitably selected according to the filling 13, which is normally approximately 30 seconds to 15 minutes. The rolled food product may be a frozen food product to which the freezing process is performed after the deep frying.

(Modification Examples)

Figure 5:
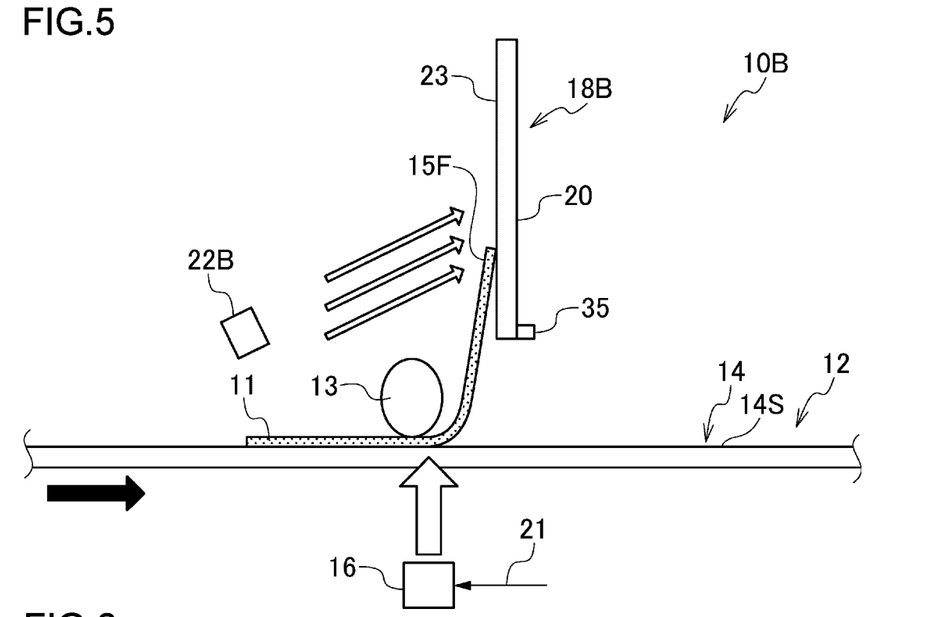
FIG. 5 is a front view schematically showing a modification example (1) of the rolled food product manufacturing apparatus according to the first embodiment.

The case where the attracting mechanism according to the first embodiment uses Coanda effect by jetting the compressed gas from the lower side of the holding surface 23 has been explained; however, the present invention is not limited to the above. In an attracting mechanism of a manufacturing apparatus 10B shown in FIG. 5 in which the same symbols are given to the same components as those of FIG. 1, the tip end 15F of the base material 11 is pressed onto the holding surface 23 by the air stream. In a holding part 18B, a nozzle 22B is arranged on the upstream side of the holding member 20 at a predetermined position above the endless belt 14. The nozzle 22B is directed obliquely upward toward the holding surface 23. The compressed gas jetted from the nozzle 22B will be an upward air stream flowing along the holding surface 23. The tip end 15F floated from the loading surface 14S is pressed onto the holding surface 23 by the upward air stream. The tip end 15F is attracted to the holding surface 23 by the upward air stream and held in the floated state. As the base material is further conveyed to the downstream side, the manufacturing apparatus 10B can wrap the filling 13 in the base material 11 to manufacture the rolled food product to which the first folding is performed in the same manner as the above embodiment. The manufacturing apparatus 10B holds the tip end 15F by the holding portion 18B in the state of being floated from the loading surface 14S; therefore, the same effect as that of the first embodiment can be obtained.

Figure 6:
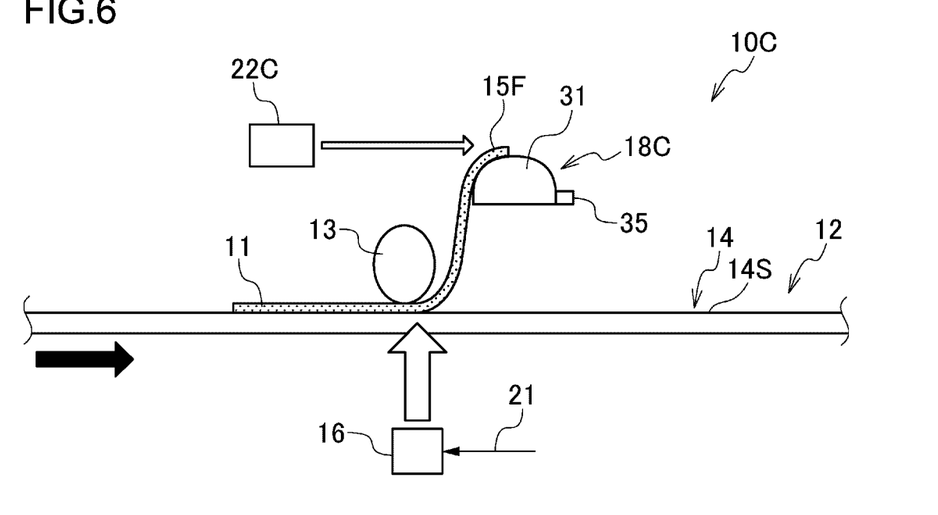
FIG. 6 is a front view schematically showing a modification example (2) of the rolled food product manufacturing apparatus according to the first embodiment.

The case where the holding member 20 is the plate-like member has been explained in the first embodiment; however, the present invention is not limited to the above. A holding part 18C of a manufacturing apparatus 10C shown in FIG. 6 in which the same symbols are given to the same components as those of FIG. 1 includes a holding member 31 formed of a long member with a semi-cylindrical shape in cross section. The holding member 31 is arranged so that a longitudinal direction is parallel to the width direction of the endless belt 14. A nozzle 22C is arranged on the upstream side of the holding member 31 at a predetermined position above the endless belt 14, which is directed to the holding member 31. The tip end 15F floated from the loading surface 14S touches an upper surface of the holding member 31 by the compressed gas jetted from the nozzle 22C to be folded toward the downstream side. The tip end 15F is held in the floated state by a frictional force between the surface of the tip end 15F and the surface of the holding member 31. As the base material 11 is further conveyed to the downstream side, the manufacturing apparatus 10C can wrap the filling 13 in the base material 11 and manufacture the rolled food product to which the first folding is performed in the same manner as the above embodiment. The manufacturing apparatus 10C holds the tip end 15F in the state of being floated from the loading surface 14S; therefore, the same effect as that of the first embodiment can be obtained.

2. Second Embodiment

Figure 7:
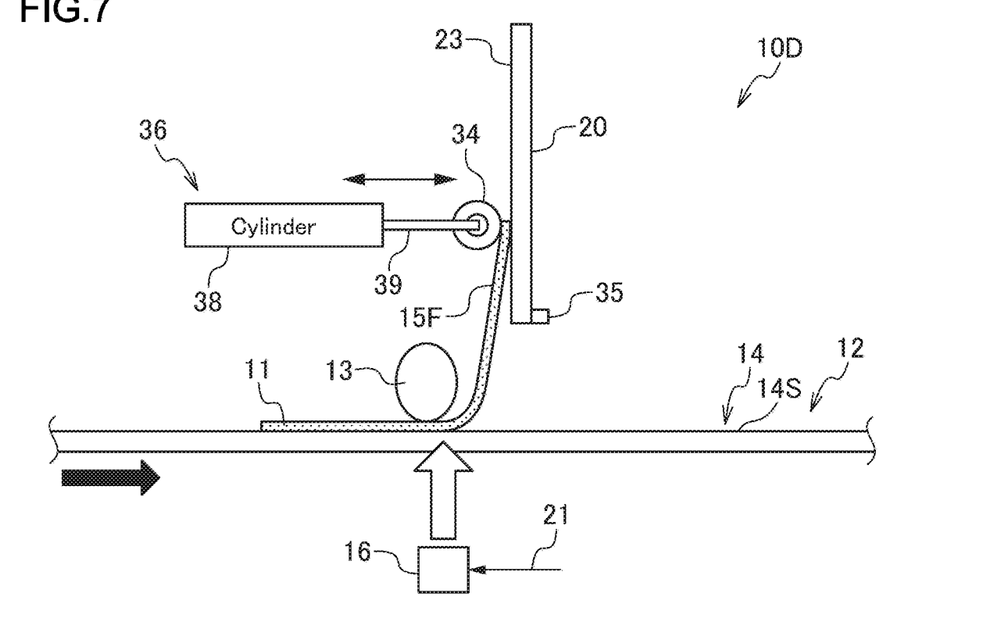
FIG. 7 is a front view schematically showing a rolled food product manufacturing apparatus according to a second embodiment.

A manufacturing apparatus according to the embodiment differs from the first embodiment in a structure of the attracting mechanism. An attracting mechanism according to the embodiment uses a mechanical force, namely, a suction force generated by static electricity. As shown in FIG. 7 in which the same symbols are given to the same components as those of FIG. 1, an attracting mechanism of a manufacturing apparatus 10D includes a pushing device 36. The pushing device 36 is arranged on the upstream side of the holding surface 23. The pushing device 36 includes a cylinder 38, a piston rod 39 provided so as to advance and retract with respect to the cylinder 38, and a contact roller 34 provided at a tip of the piston rod 39. In the pushing device 36, the piston rod 39 advances with respect to the cylinder 38, sandwiching the tip end 15F floated from the loading surface 14S between a tip of the contact roller 34 and the holding surface 23 to thereby hold the tip end 15F in the floated state.

When the base material 11 is conveyed to the downstream side and the sensor 35 detects that the base material 11 has reached the downstream side of the holding member 20, the manufacturing apparatus 10D stops the compressed gas jetted from the outlet 16 and retracts the piston rod 39 into the cylinder 38 to release the holding of the tip end 15F. Then, the tip end 15F attracted to the holding surface 23 turns downward. As the base material 11 is conveyed to the downward direction all the time, the tip end 15F is folded so as to wrap the filling 13 in the tip end 15F. As described above, the manufacturing apparatus 10D can wrap the filling 13 in the base material 11 and manufacture the rolled food product to which the first folding is performed. The manufacturing apparatus 10D according to the embodiment holds the tip end 15F in a state of being floated from the loading surface 14S; therefore, the same effect as that of the first embodiment can be obtained.

(Modification Examples)

Figure 8:
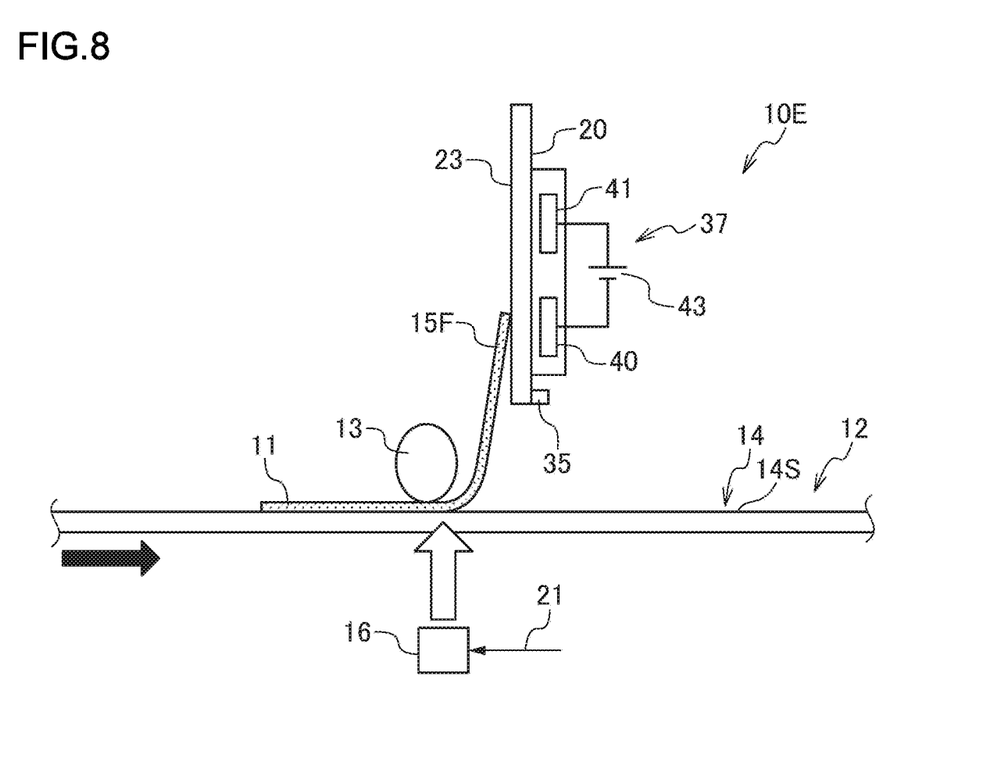
FIG. 8 is a front view schematically showing a modification example (1) of the rolled food product manufacturing apparatus according to the second embodiment.

The case where the attracting mechanisms is the pushing device 36 has been explained in the second embodiment; however, the present invention is not limited to the above. An attracting mechanism of a manufacturing apparatus 10E shown in FIG. 8 in which the same symbols are given to the same components as those of FIG. 1 includes an electrostatic generating circuit 37. The electrostatic generating circuit 37 includes a pair of electrodes 40, 41 and a power supply 43 electrically connected between the pair of electrodes 40, 41, which is provided on a back surface of the holding member 20. The holding surface 23 is positively or negatively charged by the electrostatic generating circuit 37, and static electricity is generated. The tip end 15F floated from the loading surface 14S is attracted to the holding surface 23 by a suction force due to static electricity of the holding surface 23 and held in the floated state. The manufacturing apparatus 10E stops the compressed gas jetted from the outlet 16 and also stops power supply to the pair of electrodes 40, 41 in the electrostatic generating circuit 37 to release the holding of the tip end 15F, thereby allowing the tip end 15F to turn downward and wrapping the filling 13 in the base material 11 to manufacture the rolled food product to which the first folding is performed. The manufacturing apparatus 10E according to the embodiment holds the tip end 15F in the state of being floated from the loading surface 14S; therefore, the same effect as that of the first embodiment can be obtained.

Figure 1:
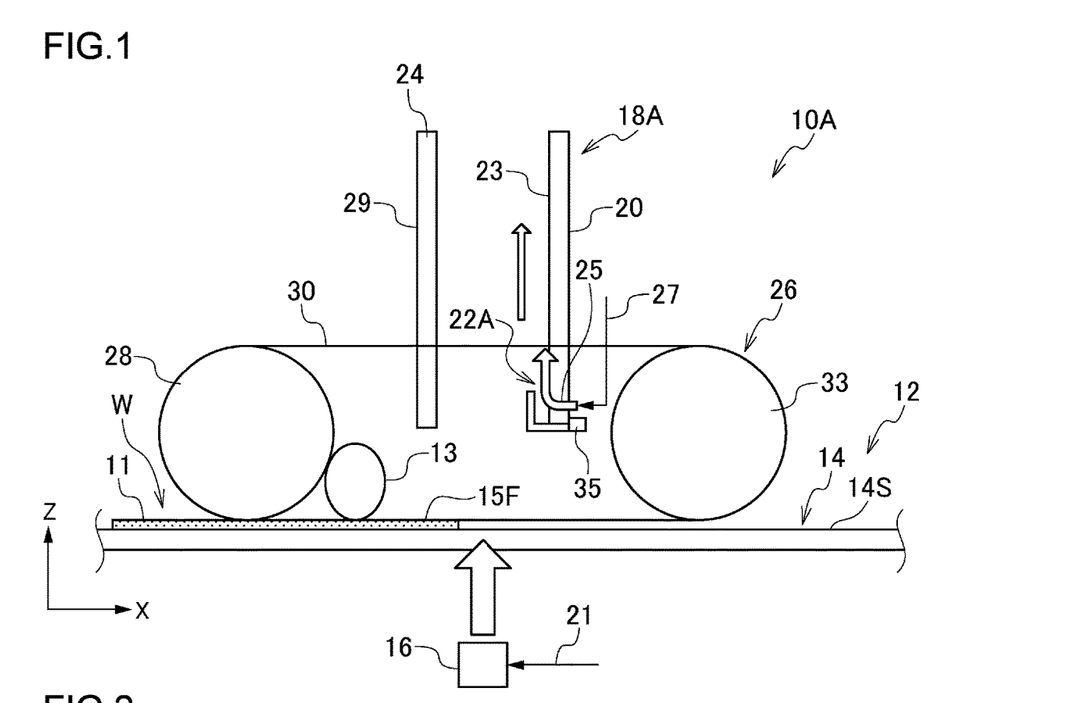
FIG. 1 is a front view schematically showing a rolled food product manufacturing apparatus according to a first embodiment.
Figure 2:
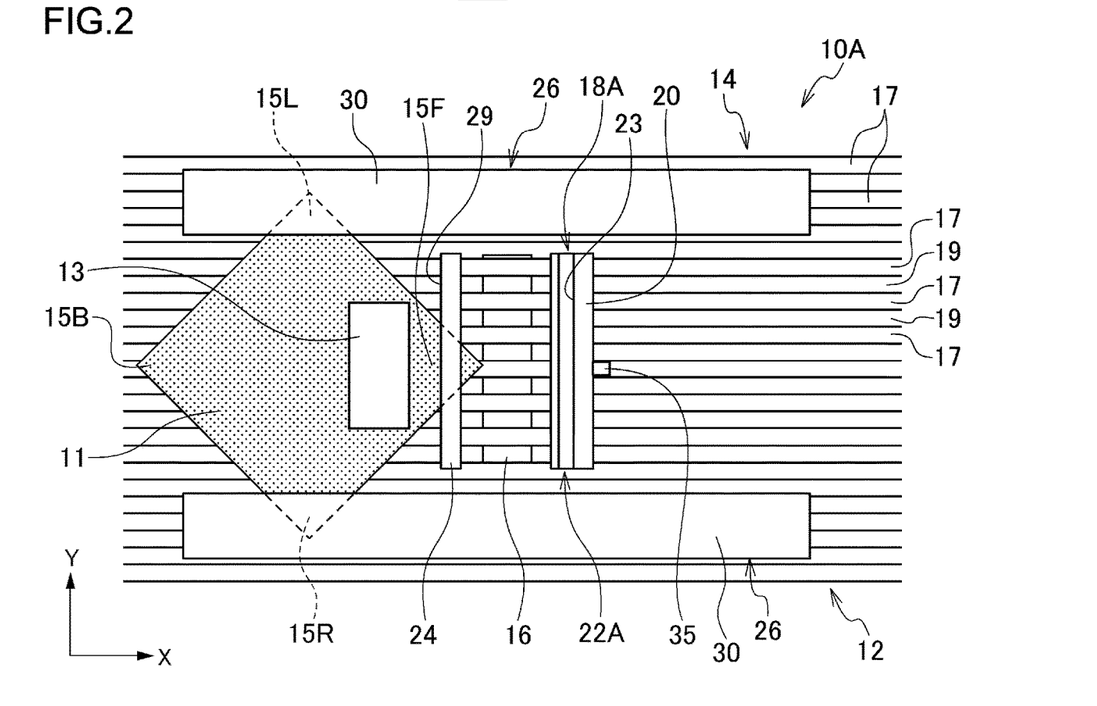
FIG. 2 is a plan view schematically showing the rolled food product manufacturing apparatus according to the first embodiment.
Figure 9:
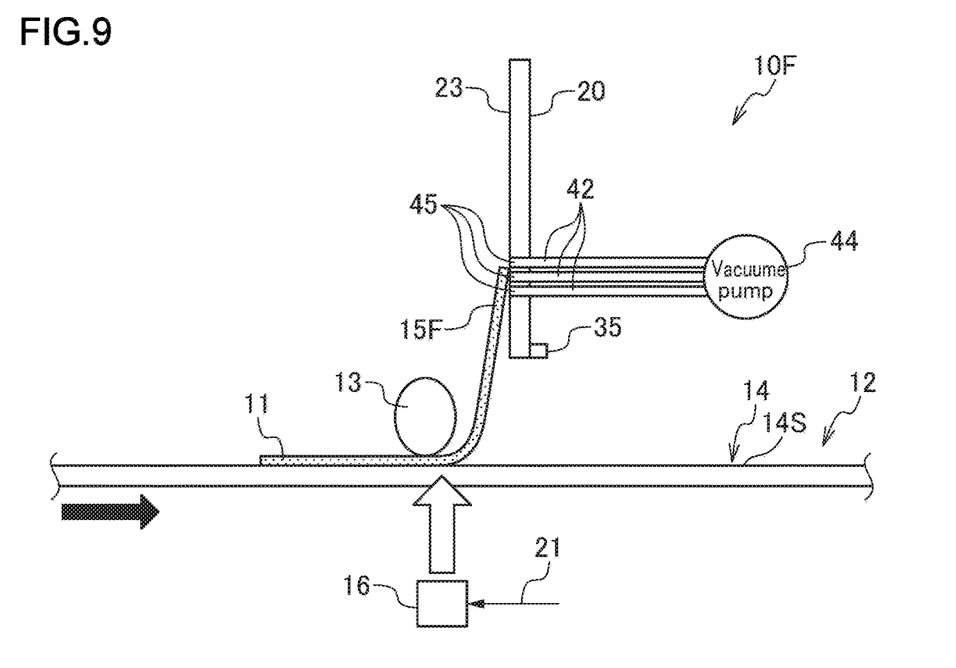
FIG. 9 is a front view schematically showing a modification example (2) of the rolled food product manufacturing apparatus according to the second embodiment.

An attracting mechanism of a manufacturing apparatus 10F shown in FIG. 9 in which the same symbols are given to the same components as those of FIG. 1 includes a vacuum pump 44 and pipes 42 connecting the vacuum pump 44 and the holding member 20. One ends of the pipes 42 are connected to the vacuum pump 44 and the other ends are connected to plural suction ports 45 provided on the surface of the holding member 20. The gas around the holding surface 23 is sucked by the vacuum pump 44 as an air stream generator through the suction ports 45. The air stream coming to the suction ports 45 is formed around the holding surface 23. The tip end 15F floated from the loading surface 14S is attracted to the suction ports 45 to be held in the floated state. The manufacturing apparatus 10F stops the compressed gas jetted from the outlet 16 and also stops the vacuum pump 44 to release the holding of the tip end 15F, thereby allowing the tip end 15F to turn downward and wrapping the filling 13 in the base material 11 to manufacture the rolled food product to which the first folding is performed. The manufacturing apparatus 10F according to the embodiment holds the tip end 15F in the state of being floated from the loading surface 14S; therefore, the same effect as that of the first embodiment can be obtained.

3. Third Embodiment

Figure 10:
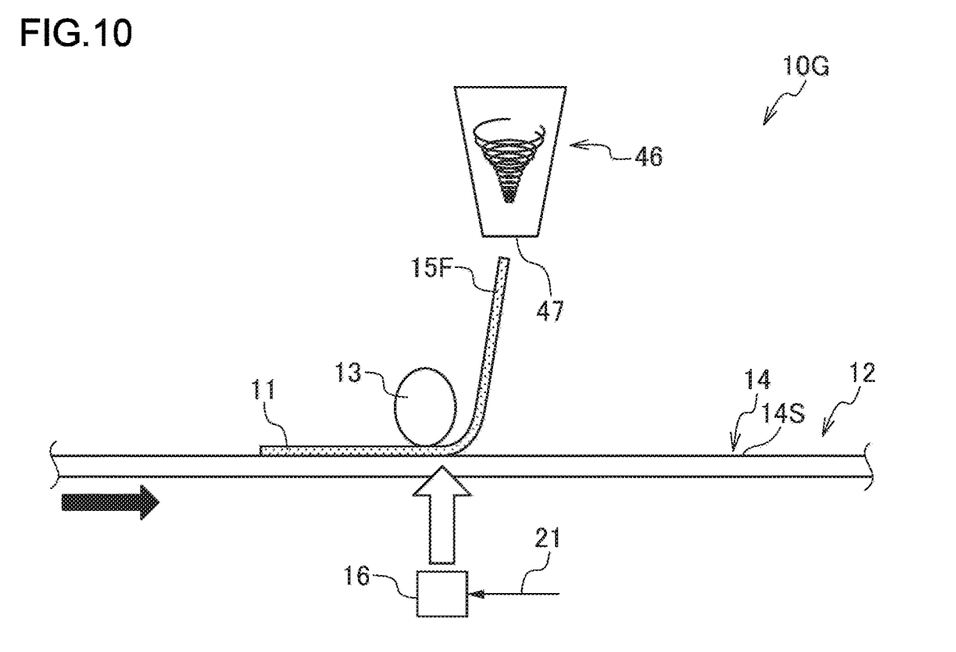
FIG. 10 is a front view schematically showing a rolled food product manufacturing apparatus according to a third embodiment.

The case where the holding part according to the first embodiment and the second embodiment includes the holding member has been explained; however, the present invention is not limited to the above. A manufacturing apparatus according the embodiment differs from the above embodiments in a point that holding is realized by the suction force or mechanical contact without providing the holding member 20. In a manufacturing apparatus 10G shown in FIG. 10 in which the same symbols are added to the same components as those of FIG. 1, the holding part includes a cyclone-type suction device 46 as an air stream generator. In the cyclone-type suction device 46, a suction port 47 is arranged on the downstream side of the outlet 16 at a predetermined position above the endless belt 14. The cyclone-type suction device 46 forms an upward air stream by sucking gas around the suction port 47. The tip end 15F floated from the loading surface 14S is held in the floated state by the upward air stream. The manufacturing apparatus 10G stops the compressed gas jetted from the outlet 16 and also stops the cyclone-type suction device 46 to release the holding of the tip end 15F, thereby allowing the tip end 15F to turn downward and wrapping the filling 13 in the base material 11 to manufacture the rolled food product to which the first folding is performed. The manufacturing apparatus 10G according to the embodiment holds the tip end 15F in the state of being floated from the loading surface 14S; therefore, the same effect as that of the first embodiment can be obtained.

Figure 11:
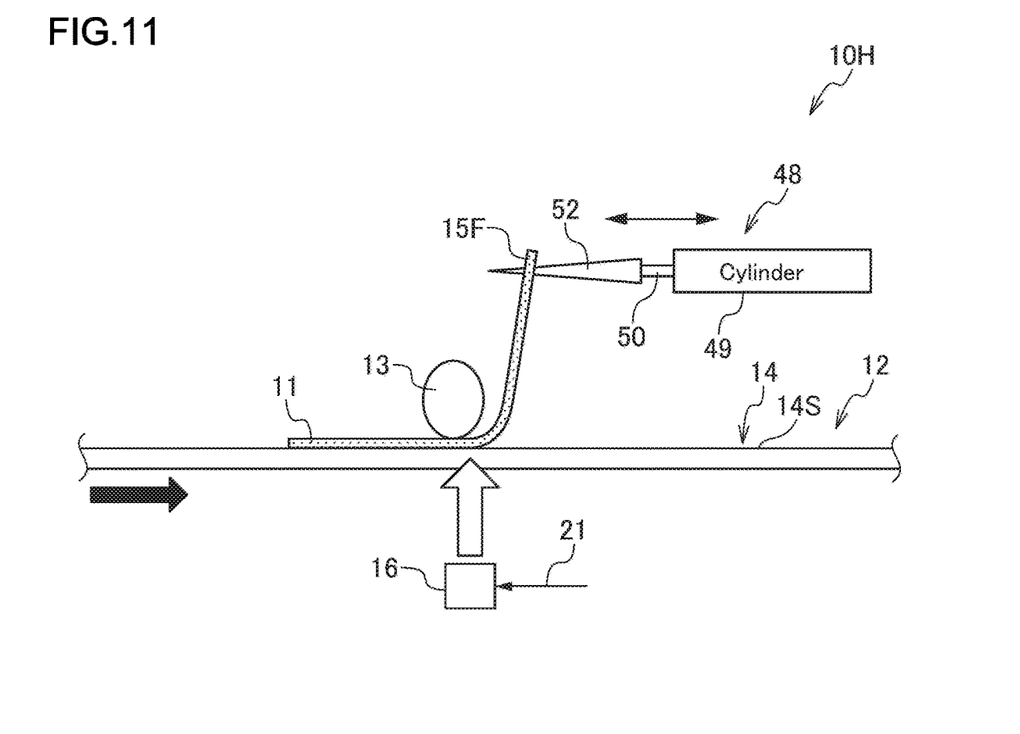
FIG. 11 is a front view schematically showing a modification example (1) of the rolled food product manufacturing apparatus according to the third embodiment.

A manufacturing apparatus 10H shown in FIG. 11 in which the same symbols are given to the same components as those of FIG. 1 includes a puncture device 48 as the holding part. The puncture device 48 includes a cylinder 49, a piston rod 50 provided so as to advance and retract with respect to the cylinder 49 and a needle part 52 provided at a tip of the piston rod 50. In the puncture device 48, the piston rod 50 advances with respect to the cylinder 49 and punctures the tip end 15F floated from the loading surface 14S with the needle part 52 to hold the tip end 15F in the floated state. The manufacturing apparatus 10H stops the compressed gas jetted from the outlet 16 and also allows the piston rod 50 to be retracted into the cylinder 49 to release the holding of the tip end 15F, thereby pulling out the needle part 52 from the tip end 15F. As described above, the manufacturing apparatus 10H allows the tip end 15F to turn downward and wrapping the filling 13 in the base material 11 to manufacture the rolled food product to which the first folding is performed. The manufacturing apparatus 10H according to the embodiment holds the tip end 15F in the state of being floated from the loading surface 14S; therefore, the same effect as that of the first embodiment can be obtained.

Figure 12:
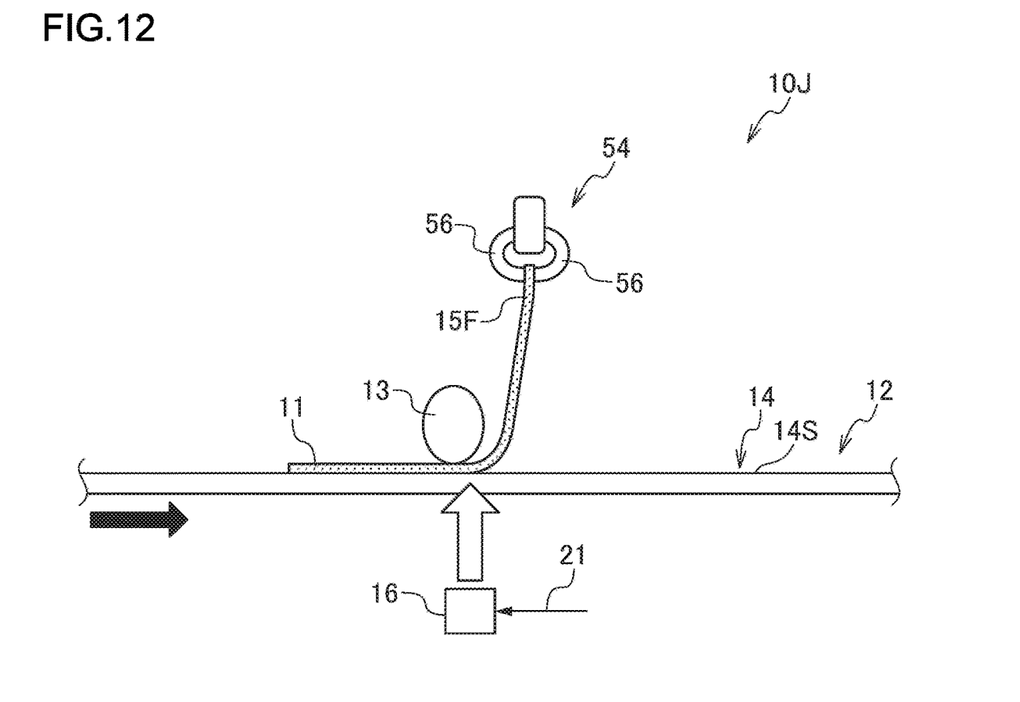
FIG. 12 is a front view schematically showing a modification example (2) of the rolled food product manufacturing apparatus according to the third embodiment.

A manufacturing apparatus 10J shown in FIG. 12 in which the same symbols are given to the same components as those of FIG. 1 includes a robot hand 54 as the holding part. The robot hand 54 is provided with a pair of finger parts 56. The robot hand 54 sandwiches the tip end 15F floated from the loading surface 14S between the pair of finger parts 56, thereby holding the tip end 15F in the floated state. The manufacturing apparatus 10J stops the compressed gas jetted from the outlet 16 and also opens the finger parts 56 to release the holding of the tip end 15F, thereby allowing the tip end 15F to turn downward and wrapping the filling 13 in the base material 11 to manufacture the rolled food product to which the first folding is performed. The manufacturing apparatus 10J according to the embodiment holds the tip end 15F in the state of being floated from the loading surface 14S; therefore, the same effect as that of the first embodiment can be obtained.

4. Modification Examples

The present invention is not limited to the above embodiments and various modifications may occur within a scope not departing from the gist of the present invention.

The case where the endless belt includes plural round belts has been explained in the above embodiments; however, the present invention is not limited to the above. It is sufficient that the endless belt allows the compressed gas jetted from the outlet to pass in the direction of the loading surface 14S, and for example, a plurality of V-belts, a mesh belt and the like can be used.

The case where the work W is the base material on which the filling is put has been explained in the above embodiments; however, the present invention is not limited to the above. The work W may be just a sheet-like base material without the filling. The shape of the base material is not limited to the square shape, but a rectangular shape, a circular shape, an oval shape and polygonal shapes may be adopted.

Figure 13:
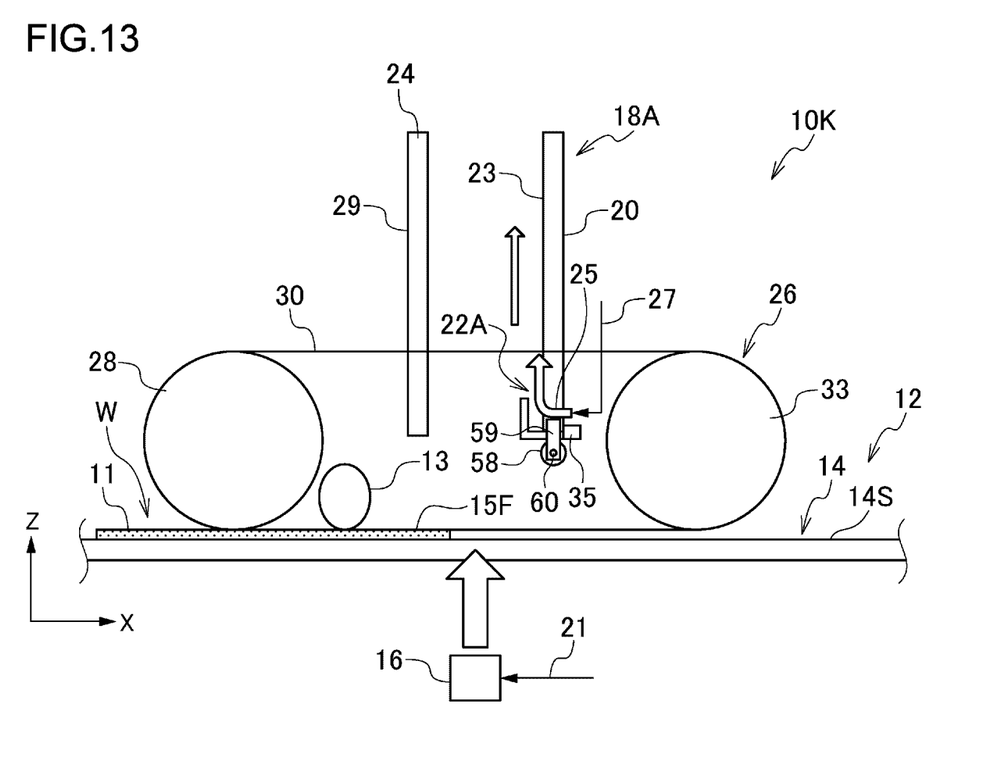
FIG. 13 is a front view schematically showing a rolled food product manufacturing apparatus according to a modification example.

A manufacturing apparatus 10K shown in FIG. 13 in which the same symbols are given to the same components as those of FIG. 1 is provided with a cylindrical roller 58 at a lower end of the holding member 20. The roller 58 is supported by a shaft 60 parallel to the holding surface 23, which is bridged between supporting parts 59 provided on both side surfaces of the holding member 20 so as to rotate. The roller 58 touches the rolled food product to which the first holding is performed which is conveyed on the endless belt 14, thereby rotating around the shaft 60. In the case of the manufacturing apparatus 10A (FIG. 1) not having the roller 58, if part of the base material 11 and the filling 13 adheres to the lower end of the holding member 20 to be a deposit with a certain size, there is a danger that the deposit interferes with passing of the rolled food product and the rolled food product to which the first folding is performed stagnates under the holding member 20. In contrast, the roller 58 is rotated in the manufacturing apparatus 10K, thereby allowing the rolled food product to pass the holding member 20 smoothly even when part of the base material and the filling 13 adheres to the surface of the roller 58. Therefore, it is possible to prevent the rolled food product to which the first folding is performed from stagnating under the holding member 20 and to improve productivity more positively in the manufacturing apparatus 10K. The roller 58 may be provided in the holding member 20 so as to rotate in the forward direction with respect to the conveying direction by a not-shown motor.

REFERENCE SIGNS LIST

10A to 10H, 10J, 10K: manufacturing apparatus
11: base material 12: belt conveyor (conveyor section)
14: endless belt (loading member)
14S: loading surface
15F: tip end (one part)
16: outlet
18A, 18B, 18C: holding part
19: gap (opening)
20: holding member
22A, 22B, 22C: nozzle
23: holding surface
24: partition plate
26: presser part
35: sensor
36: pushing device (holding part)
37: electrostatic generating circuit (holding part)
44: vacuum pump (air stream generator)
45, 47: suction port
46: cyclone-type suction device (air stream generator)
48: puncture device (holding part)
54: robot hand (holding part)
58: roller
60: shaft

The invention claimed is:

1. A rolled food product manufacturing apparatus comprising:
   an outlet from which an air stream flows;
   a conveyor section having a loading member provided with openings through which the air stream flowing from the outlet toward a loading surface passes and conveying a sheet shaped base material put on the loading surface in one direction; and
   a holding part holding one part of the base material floated from the loading surface by the air stream in a floated state,
   wherein the holding part includes a holding member provided at a predetermined position above the loading member and having a holding surface in a direction approximately orthogonal to the one direction, and an attracting mechanism attracting the floated one part of the base material to the holding surface.

2. The rolled food product manufacturing apparatus according to claim 1,
   wherein the holding part includes an air stream generator generating the air stream contacting the one part of the base material floated from the loading surface.

3. The rolled food product manufacturing apparatus according to claim 1,
   wherein the holding member is a plate shaped member, and the attracting mechanism includes a nozzle provided on a lower side of the holding member and jetting a compressed gas along the holding surface.

4. The rolled food product manufacturing apparatus according to claim 1, further comprising:
   a partition plate provided at a predetermined position above the loading member on a downstream side of the outlet and partitioning the conveyor section into a downstream side and an upstream side.

5. The rolled food product manufacturing apparatus according to claim 1,
   wherein the conveyor section includes presser parts holding both side portions of the base material in a thickness direction.

6. The rolled food product manufacturing apparatus according to claim 1, further comprising:
   a sensor detecting that the base material reaches the downstream side of the holding part.

7. The rolled food product manufacturing apparatus according to claim 1, further comprising:
   a cylindrical roller capable of rotating about a shaft parallel to the holding surface, the cylindrical roller being provided at a lower end of the holding member.

8. A rolled food product manufacturing method by using the rolled food product manufacturing apparatus of claim 1, the method comprising:
   conveying the sheet shaped base material by the conveyer section in the one direction;
   floating one part of the base material by the air stream;
   holding the one part of the base material floated by the air stream in a floated state; and
   folding the base material by bending the one part of the base material held in the floated state toward the other part opposite to the one part of the base material.

9. A rolled food product manufacturing apparatus comprising:
   an outlet from which an air stream flows;
   a conveyor section having a loading member provided with openings through which the air stream flowing from the outlet toward a loading surface passes and conveying a sheet shaped base material put on the loading surface in one direction;
   a holding part holding one part of the base material floated from the loading surface by the air stream in a floated state; and
   a partition plate provided at a predetermined position above the loading member on a downstream side of the outlet and partitioning the conveyor section into a downstream side and an upstream side.

* * * * *